US012679275B2

(12) United States Patent
Sekine et al.

(10) Patent No.: US 12,679,275 B2
(45) Date of Patent: Jul. 14, 2026

(54) VEHICLE STEP DEVICE AND VEHICLE INCLUDING VEHICLE STEP DEVICE

(71) Applicant: AISIN CORPORATION, Kariya (JP)

(72) Inventors: Kimihiro Sekine, Kariya (JP); Masashi Miwa, Kariya (JP); Ryota Tachi, Kariya (JP)

(73) Assignee: AISIN CORPORATION, Kariya (JP)

( * ) Notice: Subject to any disclaimer, the term of this patent is extended or adjusted under 35 U.S.C. 154(b) by 338 days.

(21) Appl. No.: 18/351,956

(22) Filed: Jul. 13, 2023

(65) Prior Publication Data

US 2024/0025345 A1     Jan. 25, 2024

(30) Foreign Application Priority Data

Jul. 19, 2022   (JP) ................................. 2022-114771
Jun. 19, 2023   (JP) ................................. 2023-100203

(51) Int. Cl.
*B60R 3/02*          (2006.01)

(52) U.S. Cl.
CPC ..................................... *B60R 3/02* (2013.01)

(58) Field of Classification Search
CPC ...................................................... B60R 3/02
See application file for complete search history.

(56) References Cited

U.S. PATENT DOCUMENTS 3,762,742 A * 10/1973 Bucklen ..................... B60R 3/02
                                                         280/166
3,980,319 A * 9/1976 Kirkpatrick ............... B60R 3/02
                                                         182/89

| | | | | |
|---|---|---|---|---|
| 10,081,302 B1 * | 9/2018 | Frederick | ................ | B60R 3/002 |
| 2011/0233889 A1 * | 9/2011 | Watson | ..................... | B60R 3/02 |
| | | | | 280/166 |
| 2015/0123374 A1 * | 5/2015 | Smith | ..................... | B60R 3/002 |
| | | | | 280/166 |
| 2016/0023609 A1 * | 1/2016 | Watson | ................... | B60R 3/002 |
| | | | | 280/166 |
| 2016/0264057 A1 * | 9/2016 | Lee | ........................... | B60R 3/02 |
| 2018/0001825 A1 * | 1/2018 | Long | .................... | B61D 23/025 |
| 2018/0134221 A1 * | 5/2018 | Burton | ...................... | B60R 3/02 |
| 2018/0314269 A1 * | 11/2018 | Dudar | ...................... | B60R 3/02 |
| 2019/0344837 A1 * | 11/2019 | Toki | ..................... | B62D 35/001 |
| 2020/0062183 A1 * | 2/2020 | Smith | ..................... | G05D 3/10 |
| 2023/0294608 A1 * | 9/2023 | Gaither | .................... | B60R 3/02 |
| | | | | 280/166 |

FOREIGN PATENT DOCUMENTS

| | | | | |
|---|---|---|---|---|
| CN | 106143320 A | * 11/2016 | .............. | B60R 3/02 |
| CN | 106585499 A | * 4/2017 | ............ | B60R 3/002 |
| JP | 2008-222183 A | | 9/2008 | |
| JP | 2020-032847 A | | 3/2020 | |

* cited by examiner

*Primary Examiner* — John Olszewski
(74) *Attorney, Agent, or Firm* — Finnegan, Henderson, Farabow, Garrett and Dunner, LLP

(57)          ABSTRACT

A vehicle step device includes: a step portion that is attached to a side of a vehicle and is deployed from a retracted position to a getting-on/off position when an occupant gets on and off the vehicle; and a drive unit configured to drive the step portion between the retracted position and the getting-on/off position. The drive unit deploys the step portion to a traveling position located outward of the retracted position in a vehicle width direction when a predetermined condition is satisfied in a vehicle traveling state.

10 Claims, 6 Drawing Sheets

FRONT ← → REAR

DXA ↔ DX ↔ DXB

FRONT

DY REAR

FRONT

REAR

START

S1
VEHICLE SPEED > 0?
NO

YES

S2
STEP PORTION LOCATED AT TRAVELING POSITION?
YES

NO

S3
VEHICLE SPEED ≥ FIRST SPEED?
NO

YES

S4
MOVE STEP PORTION TO TRAVELING POSITION

S5
VEHICLE SPEED ≤ SECOND SPEED?
NO

YES

S6
MOVE STEP PORTION TO RETRACTED POSITION

END

P3

13   12A

DXB

DXA

P1

12

12B

FRONT   REAR

START

S11

STEP PORTION
IN STATE OF BEING DRIVEN
TO TRAVELING POSITION?

NO

YES

S12

STEP PORTION
AT POSITION DEVIATED FROM
TRAVELING POSITION?

NO

YES

S13

DRIVE STEP PORTION BY PREDE-
TERMINED CORRECTION DISTANCE

END

VEHICLE STEP DEVICE AND VEHICLE INCLUDING VEHICLE STEP DEVICE

CROSS REFERENCE TO RELATED APPLICATIONS

This application is based on and claims priority under 35 U.S.C. § 119 to Japanese Patent Application 2022-114771, filed on Jul. 19, 2022 and Japanese Patent Application 2023-100203, filed on Jun. 19, 2023, the entire content of which is incorporated herein by reference.

TECHNICAL FIELD

This disclosure relates to a vehicle step device and a vehicle including the vehicle step device.

BACKGROUND DISCUSSION

JP 2020-032847A (Reference 1) discloses a vehicle step device. The vehicle step device includes an auxiliary step attached to a vehicle. The vehicle step device drives the auxiliary step. The vehicle step device includes a rectifying plate. The rectifying plate is provided to improve aerodynamic characteristics of the vehicle during traveling. When the step portion is located at a non-use position, the rectifying plate is located at a deployed position.

In the technique of Reference 1, the rectifying plate is rotated in accordance with a movement of the step portion. Therefore, a structure of the vehicle step device is complicated. There is room for improvement in the vehicle step device and a vehicle including the vehicle step device with regard to this point.

SUMMARY

According to an aspect of this disclosure, a vehicle step device includes: a step portion that is attached to a side of a vehicle and is deployed from a retracted position to a getting-on/off position when an occupant gets on and off the vehicle; and a drive unit configured to drive the step portion between the retracted position and the getting-on/off position, in which the drive unit deploys the step portion to a traveling position located outward of the retracted position in a vehicle width direction when a predetermined condition is satisfied in a vehicle traveling state.

According to another aspect of this disclosure, a vehicle includes the vehicle step device according to the aspect 1. This configuration can contribute to improvement in the aerodynamic characteristics of the vehicle during the traveling of the vehicle.

A vehicle step device and a vehicle including the vehicle step device can contribute to improvement in aerodynamic characteristics of the vehicle during traveling of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

Figure 1:
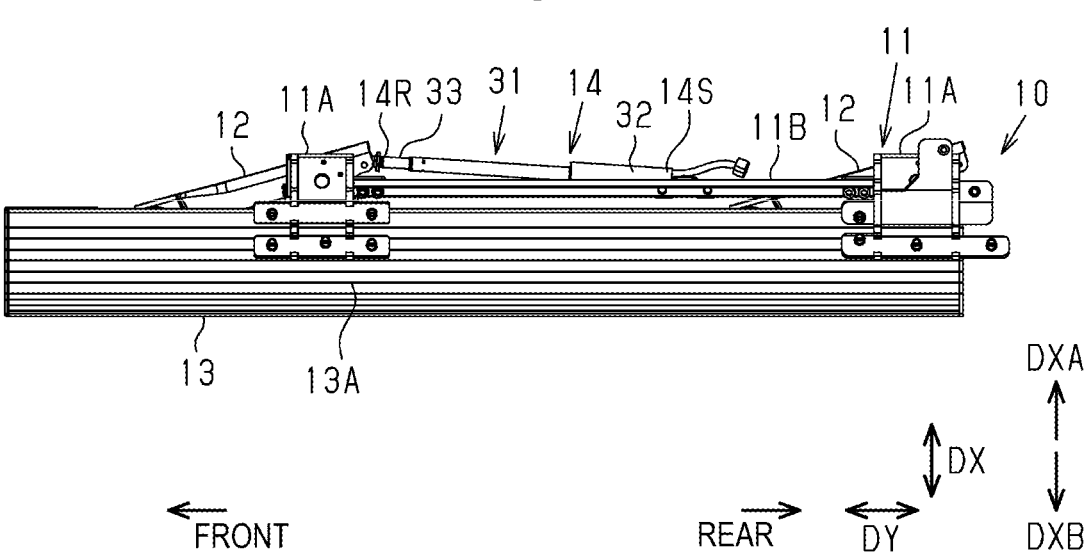
FIG. 1 is a plan view of a vehicle step device according to a first embodiment when a step portion is located at a retracted position.

A vehicle step device 10 according to a first embodiment will be described with reference to FIGS. 1 to 8. The vehicle step device 10 is attached to a side of a vehicle body 2. In the following description, a state where the vehicle step device 10 is attached to the vehicle body 2 is referred to as an "attached state of the vehicle step device 10".

A front-rear direction of the vehicle step device 10 coincides with a vehicle front-rear direction DY of a vehicle 1 in the attached state of the vehicle step device 10. A width direction of the vehicle step device 10 coincides with a vehicle width direction DX in the attached state of the vehicle step device 10. In the attached state of the vehicle step device 10, a widthwise inward direction DXA indicates a direction facing a widthwise center of the vehicle 1 in the vehicle width direction DX. In the attached state of the vehicle step device 10, a widthwise outward direction DXB indicates a direction opposite to the widthwise inward direction DXA.

The vehicle step device 10 is attached to a vicinity of a vehicle entrance closed by an entrance door in the vehicle 1. A step portion 13 of the vehicle step device 10 is used as an auxiliary step for getting on and off. The step portion 13 is used for an occupant to get on and off the vehicle. The step portion 13 is disposed below a lower end of the vehicle entrance. The step portion 13 is moved by a power of a motor 14A. The step portion 13 is deployed from a retracted position P1 where the step portion 13 is retracted below a bottom plate of the vehicle body 2 to a maximum deployed position P4. The step portion 13 is maintained at a getting-on/off position P2 when the occupant gets on and off the vehicle. The getting-on/off position P2 is located between the retracted position P1 and the maximum deployed position P4 in the vehicle width direction DX, or is at the same position as the maximum deployed position P4. In the present embodiment, the getting-on/off position P2 is at the same position as the maximum deployed position P4. The getting-on/off position P2 (see FIG. 1) is located outward of the retracted position P1 (see FIG. 1) relative to the vehicle body 2 in the vehicle width direction DX. When the step portion 13 is deployed to the getting-on/off position P2 (see FIG. 2), at least a part of the step portion 13 is exposed from the vehicle body 2 in a plan view (see FIG. 6).

The maximum deployed position P4 indicates the position of the step portion 13 when the step portion 13 is moved to a maximum operable position within an allowable operation range by the vehicle step device 10. When the position is indicated by a rotation angle of arms 12, an example of the maximum deployed position P4 will be described. When the allowable operation range of the rotation angle of the arms 12 is 0 degrees to 60 degrees, the maximum deployed position P4 of the step portion 13 is 60 degrees. When the allowable operation range of the rotation angle of the arms 12 is 0 degrees to 90 degrees, the maximum deployed position P4 of the step portion 13 is 90 degrees. When the allowable operation range of the rotation angle of the arms 12 is 0 degrees to 150 degrees, the maximum deployed position P4 of the step portion 13 is 150 degrees. As described above, the getting-on/off position P2 may be at the same position as the maximum deployed position P4. The maximum deployed position P4 may be a position at which the step portion 13 is further deployed beyond the getting-on/off position P2.

Figure 2:
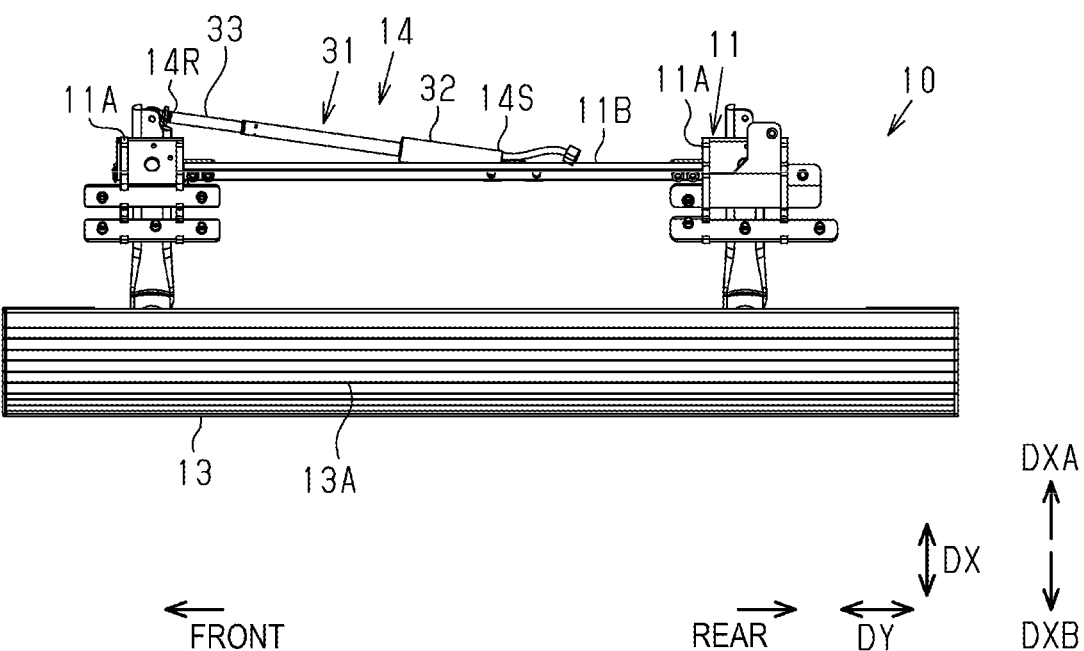
FIG. 2 is a plan view of the vehicle step device when the step portion is located at a getting-on/off position.

As shown in FIGS. 1 and 2, the vehicle step device 10 includes a base 11 that is attached to the vehicle body 2, the arms 12 that are attached to the base 11, the step portion 13 that is assembled to the arms 12, and a drive unit 14. The vehicle step device 10 may include a plurality of arms 12. In the present embodiment, the vehicle step device 10 includes two arms 12.

Base

The base 11 is fixed to a rocker of the vehicle 1. The rocker constitutes a lower portion of a side surface of the vehicle body. The base 11 is fixed to the rocker by a bolt. The base 11 may be fixed to a member or the like located on the widthwise inward direction DXA relative to the rocker by a bolt. The base 11 supports the arms 12.

Figure 3:
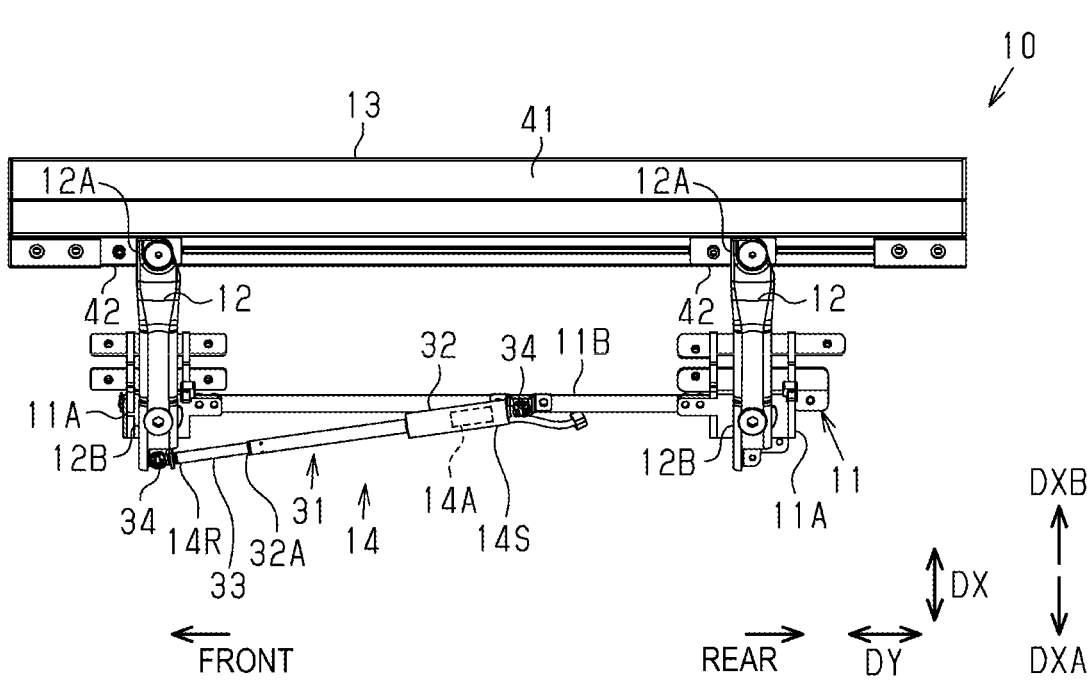
FIG. 3 is a bottom view of the vehicle step device when the step portion is located at the getting-on/off position.

As shown in FIG. 3, in the present embodiment, the base 11 includes two brackets 11A and a coupling bar 11B that couples the two brackets 11A. The two brackets 11A are attached to the rocker of the vehicle body 2 at an interval in the vehicle front-rear direction DY. The coupling bar 11B is formed of an iron steel material or an aluminum alloy.

Arm

The arms 12 support the step portion 13. The step portion 13 is attached to a distal end portion 12A of each of the arms 12. The front arm 12 of the two arms 12 supports a front portion of the step portion 13. The rear arm 12 supports a rear portion of the step portion 13. A base portion 12B of each of the arms 12 is rotatably attached to the base 11. The arms 12 rotate within a range from 0 degrees to less than 90 degrees.

The arms 12 each include the distal end portion 12A to which the step portion 13 is assembled, and the base portion 12B that is opposite to the distal end portion 12A. The base portion 12B is attached to the vehicle body 2 via the bracket 11A. The arm 12 rotates about a central axis Cl of the base portion 12B. The base portion 12B of the arm 12 is attached to the bracket 11A via a first shaft (rotation shaft) having the central axis C1.

Figure 4:
FIG. 4 is a front view of the vehicle step device when the step portion is located at the getting-on/off position.

As shown in FIG. 4, in the attached state of the vehicle step device 10, the central axis Cl of the first shaft is inclined downward toward the widthwise inward direction DXA.

With the rotation of the arm 12, the distal end portion 12A of the arm 12 is moved from a first position when the step portion 13 is located at the retracted position P1 to a second position when the step portion 13 is located at the getting-on/off position P2. The second position is located behind the first position and toward the widthwise outward direction DXB.

Step Portion

The step portion 13 is supported by the two arms 12. The step portion 13 is moved between the retracted position P1 and the maximum deployed position P4 as the arms 12 rotate. At the time of getting on and off, the step portion 13 is moved between the retracted position P1 and the getting-on/off position P2 as the arms 12 rotate. At the retracted position P1, all or a part of the step portion 13 is disposed below the vehicle body 2. At the getting-on/off position P2, all or a part of the step portion 13 is exposed from the vehicle body 2. In the plan view of the step portion 13, an area of the part exposed from the vehicle body 2 at the getting-on/off position P2 is larger than an area of the part exposed from the vehicle body 2 at the retracted position P1.

As shown in FIG. 4, the step portion 13 includes a step body portion 41 and arm attachment portions 42 to which the arms 12 are attached. The step body portion 41 is configured such that an upper surface 13A is horizontal in the attached state of the vehicle step device 10.

The arm attachment portion 42 is provided on a lower surface of the step body portion 41. The arm attachment portion 42 includes an inclined surface 42A inclined upward toward the widthwise inward direction DXA. The inclined surface 42A is perpendicular to a central axis C2 of a second shaft. The distal end portion 12A of the arm 12 is coupled to the arm attachment portion 42. The distal end portion 12A of the arm 12 is rotatably attached to the arm attachment portion 42. The distal end portion 12A of the arm 12 is attached to the arm attachment portion 42 via the second shaft. In the attached state of the vehicle step device 10, the central axis C2 of the second shaft is parallel to the central axis Cl of the first shaft.

The step portion 13 includes a rectifying portion 13X that rectifies a flow of air. The rectifying portion 13X is formed as a barrier that blocks the circulation of air between an inner region AR1 and an outer region AR2. The inner region AR1 is defined as a region located inward of the step portion 13 in a space below the vehicle 1 (a space between the bottom of the vehicle 1 and a road surface) when the step portion 13 is disposed at the retracted position P1. The outer region AR2 is defined as a region located outward of the step portion 13 when the step portion 13 is disposed at the retracted position P1. The outer region AR2 is substantially the same as a region located in the widthwise outward direction DXB relative to a side surface of the vehicle 1.

The rectifying portion 13X protrudes downward from an outer end of the step portion 13 and extends in the vehicle front-rear direction DY. Specifically, the rectifying portion 13X is provided on a lower surface of an outer end portion of the step body portion 41. The rectifying portion 13X is configured such that a lower portion of the rectifying portion 13X does not rub against the ground when the step portion 13 is disposed at the getting-on/off position P2.

In one example, the rectifying portion 13X includes a first surface 13B and a second surface 13C. The first surface 13B extends downward from the outer end of the step portion 13. The first surface 13B may extend vertically downward. The second surface 13C is inclined upward from the first surface 13B toward the widthwise inward direction DXA. An inner end of the second surface 13C is connected to a bottom surface 13D of the step portion 13. In one example, the bottom surface 13D of the step portion 13 is horizontal in the attached state of the vehicle step device 10. The bottom surface 13D of the step portion 13 may be inclined.

Drive Unit

The drive unit 14 drives the step portion 13 relative to the base 11. The drive unit 14 drives the step portion 13 by rotating the arms 12. The drive unit 14 includes a first end portion 14R and a second end portion 14S opposite to the first end portion 14R. The second end portion 14S is moved relative to the first end portion 14R such that an interval distance between the first end portion 14R and the second end portion 14S is increased or reduced.

As shown in FIG. 3, the drive unit 14 includes an extendable unit 31 and a controller 50. The extendable unit 31 includes a body portion 32 and a moving portion 33 that is moved relative to the body portion 32. The body portion 32 includes the second end portion 14S. In the body portion 32, an opening 32A is provided at an end portion opposite to the second end portion 14S. The moving portion 33 includes the first end portion 14R. The first end portion 14R includes a part farthest from the second end portion 14S in the moving portion 33. The second end portion 14S includes a part farthest from the first end portion 14R in the body portion 32. The moving portion 33 can enter the body portion 32 from the opening 32A of the body portion 32. With the movement of the moving portion 33 in the body portion 32, the extendable unit 31 extends and contracts.

In the present embodiment, the first end portion 14R is defined as an end portion of the moving portion 33, and the second end portion 14S is defined as an end portion of the body portion 32. In another example, the first end portion 14R may be defined as the end portion of the body portion 32, and the second end portion 14S may be defined as the end portion of the moving portion 33.

The second end portion 14S of the body portion 32 is coupled to the coupling bar 11B via a universal joint 34. The first end portion 14R of the moving portion 33 is connected to the arm 12 via a universal joint 34.

The body portion 32 includes the motor 14A and a spindle rotated by the motor 14A. The moving portion 33 includes a nut engaged with the spindle. The moving portion 33 is moved along an axial direction of the spindle together with the nut by the rotation of the spindle. In this way, the extendable unit 31 extends and contracts. The arms 12 are rotated as the extendable unit 31 extends and contracts, and the step portion 13 is moved as the arms 12 are rotated.

The drive unit 14 can drive the step portion 13 between the retracted position P1 and the maximum deployed position P4. In the case of getting on and off of an occupant, the drive unit 14 drives the step portion 13 between the retracted position P1 and the getting-on/off position P2. When the step portion 13 is not used, the drive unit 14 drives the step portion 13 to the retracted position P1. When the step portion 13 is used when an occupant gets on and off the vehicle, the drive unit 14 drives the step portion 13 to the getting-on/off position P2. When a predetermined condition is satisfied in a vehicle traveling state, the drive unit 14 deploys the step portion 13 to a traveling position P3 located outward of the retracted position P1 in the vehicle width direction DX. The traveling position P3 is located between the retracted position P1 and the getting-on/off position P2 or at the getting-on/off position P2. The vehicle traveling state indicates that a vehicle speed of the vehicle 1 is higher than 0 km/h. That is, the vehicle traveling state indicates that the vehicle 1 is traveling. The case where the predetermined condition is satisfied specifically indicates a case where the vehicle speed is equal to or higher than a predetermined value. The traveling position P3 may be a position at which the step portion 13 is most deployed outward in the vehicle width direction DX. In this case, the step portion 13 may be located further outward of the getting-on/off position P2 in the vehicle width direction DX.

In one example, when the vehicle speed is equal to or higher than a first speed, the drive unit 14 drives the step portion 13 to the traveling position P3. The first speed is set to, for example, a predetermined value of 75 km/h or more. In this case, the drive unit 14 maintains the step portion 13 at the retracted position P1 until the vehicle speed is equal to or higher than the first speed.

The predetermined condition may be that a wind pressure becomes a predetermined value or more. When the wind pressure received by the vehicle 1 is equal to or higher than a first wind pressure, the drive unit 14 drives the step portion 13 to the traveling position P3. The predetermined condition may be that the vehicle 1 travels on an expressway. Whether the vehicle 1 travels on an expressway is determined based on communication between an ETC on-board device and an ETC roadside wireless device at a tollgate in the vehicle 1 using an electronic toll collection system (ETC).

When the vehicle speed is equal to or lower than a second speed in a state where the step portion 13 is maintained at the traveling position P3, the drive unit 14 drives the step portion 13 to the retracted position P1. The second speed is lower than the first speed. The second speed is set to a predetermined value such as 40 km or less.

When the negative acceleration of the vehicle 1 is smaller than a first specified value in a state where the step portion 13 is maintained at the traveling position P3, the drive unit 14 may drive the step position 13 to the retracted position P1. The negative acceleration is a negative value. The first specified value is a negative value. The first specified value is a value close to a negative acceleration during sudden braking or a value close to a negative acceleration during a sharp curve.

Figure 5:
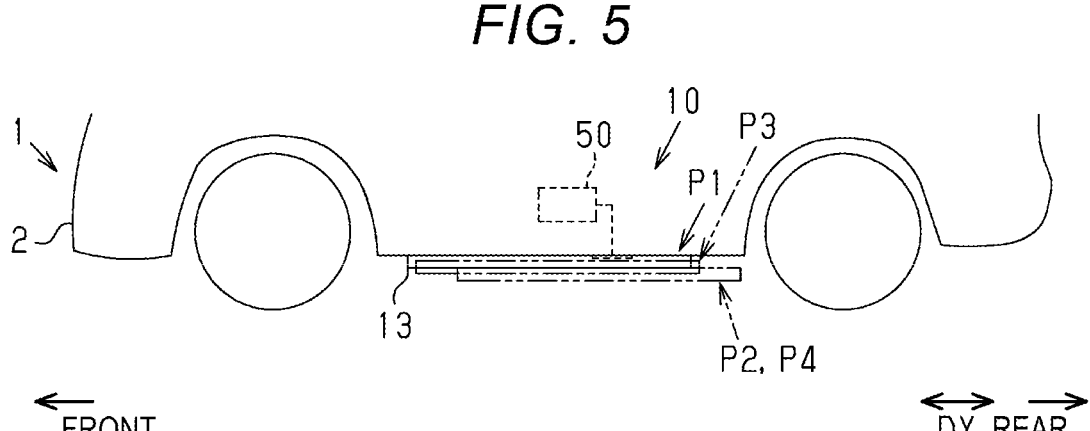
FIG. 5 is a side view of a vehicle, which shows deployment of the step portion of the vehicle step device.

As shown in FIG. 5, the traveling position P3 is lower than the retracted position P1. The traveling position P3 is higher than the getting-on/off position P2 in the embodiment. A height of the traveling position P3 correlates with a position of the traveling position P3 in the vehicle width direction DX. When setting of the position of the traveling position P3 in the vehicle width direction DX is changed, the height of the traveling position P3 changes in accordance with the change.

Figure 6:
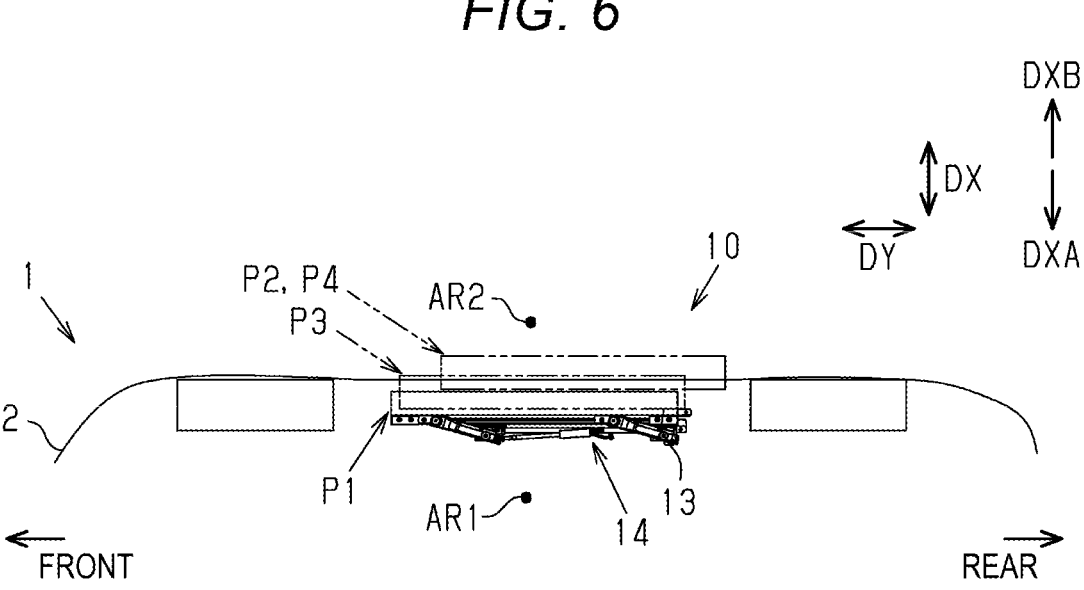
FIG. 6 is a bottom view of the vehicle, which shows the deployment of the step portion of the vehicle step device.

As shown in FIG. 6, the traveling position P3 is located rearward of the retracted position P1 and forward of the getting-on/off position P2. When the step portion 13 is located at the traveling position P3, the distal end portion 12A of the arm 12 is located forward of the base portion 12B.

Figures 7, 8:
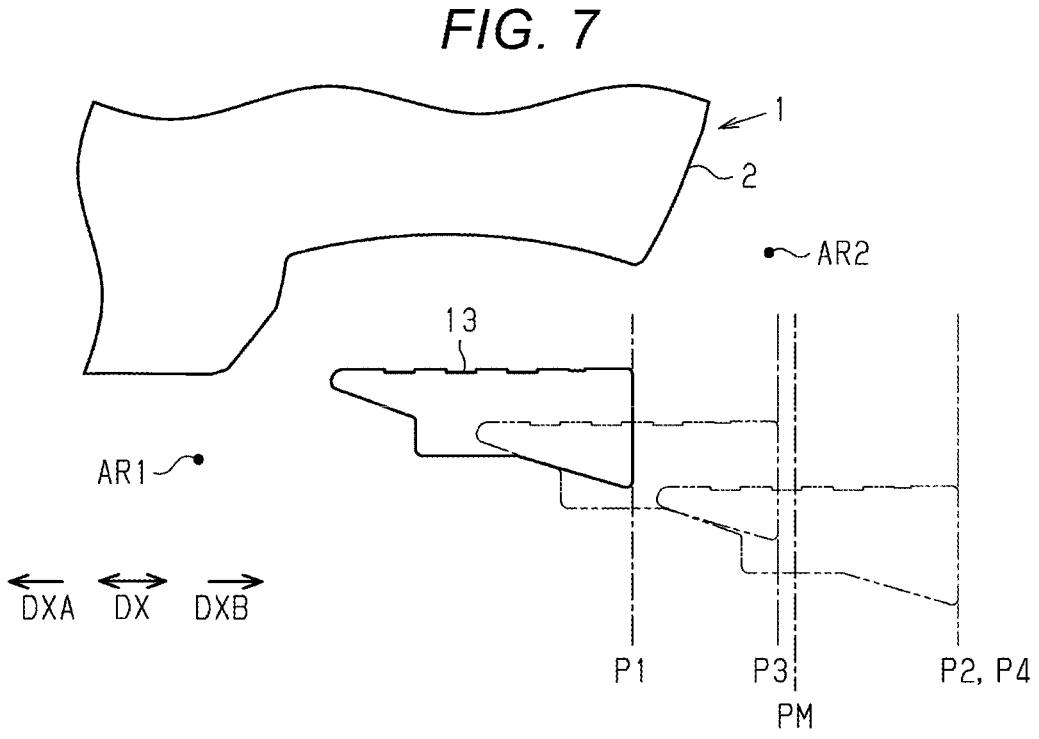
FIG. 7 is a cross-sectional view of the vehicle, which shows the deployment of the step portion of the vehicle step device.
FIG. 8 is a flowchart of step position control processing executed by a controller.

The traveling position P3 is located between the retracted position P1 and the getting-on/off position P2 in the vehicle width direction DX, or at the getting-on/off position P2. The traveling position P3 is located inward of a predetermined position (hereinafter, referred to as a "vehicle width related predetermined position") separated by a predetermined distance outward in the vehicle width direction DX from the outermost end on the outermost side in the entire vehicle width, or is located at the predetermined position. The entire width of the vehicle is defined according to a regulation relating to the vehicle 1 in each country. The predetermined distance and the predetermined position (vehicle width related predetermined position) may be values (hereinafter, referred to as "regulation positions") set according to the regulation relating to the vehicle 1 in each country. An example of the predetermined distance is 10 mm. Setting of the predetermined distance may be changed. The predetermined distance may be changed by a setting change device that can access the controller 50. The entire width of the vehicle indicates the largest width dimension of the vehicle 1 in the vehicle traveling state. Specifically, in many cases, in a passenger car, the entire width of the car is a length from a right end of a right side mirror to a left end of a left side mirror. In another example, as shown in FIG. 7, the traveling position P3 is located between an intermediate position PM and the retracted position P1 in the vehicle width direction DX. The traveling position P3 may be the intermediate position PM. The intermediate position PM is at the same distance from both the retracted position P1 and the getting-on/off position P2. In FIG. 7, a position of the step portion 13 is shown by the outer end of the step portion 13.

Controller

The controller 50 of the drive unit 14 will be described. The controller 50 causes the motor 14A to operate. The controller 50 is provided in the vehicle 1. The controller 50 may be formed as a part of a vehicle control device that controls the vehicle 1. The controller 50 may be a sub-control device controlled by the vehicle control device that controls the vehicle 1. The controller 50 may be incorporated in the body portion 32 of the drive unit 14.

The controller 50 receives a step command relating to an operation of the step portion 13 from the vehicle 1. The controller 50 acquires a vehicle speed and an acceleration from the vehicle 1. The controller 50 controls the position of the step portion 13 based on the step command, the vehicle speed, and the acceleration.

When receiving a step retracting command indicating retracting of the step portion 13 from the vehicle 1, the controller 50 drives the step portion 13 to the retracted position P1 by causing the motor 14A of the extendable unit 31 to operate. In one example, the step retracting command indicating retracting of the step portion 13 is issued from the vehicle 1 based on the closing of the entrance door of the vehicle 1. In this case, the entrance door of the vehicle 1 is closed, and the step portion 13 is retracted in the space below the vehicle 1.

When receiving a step deploying command indicating deploying of the step portion 13 from the vehicle 1, the controller 50 drives the step portion 13 to the getting-on/off position P2 by causing the motor 14A of the extendable unit 31 to operate. In one example, the step deploying command indicating deploying of the step portion 13 is issued from the vehicle 1 based on the opening of the entrance door of the vehicle 1. In this case, the entrance door of the vehicle 1 is opened, and the step portion 13 is deployed from the space below the vehicle 1.

When a predetermined condition is satisfied, the controller 50 drives the step portion 13 to the traveling position P3. By executing step position control processing, the controller 50 determines whether the predetermined condition is satisfied, and drives the step portion 13 to the traveling position P3 based on the determination that the predetermined condition is satisfied.

The step position control processing will be described with reference to FIG. 8. The controller 50 repeatedly executes the step position control processing. The controller 50 may periodically execute the step position control processing. The controller 50 executes the step position control processing to adjust the position of the step portion 13 during the traveling of the vehicle.

In first processing S1, the controller 50 determines whether the vehicle 1 is moving. Specifically, when the vehicle speed is higher than 0, the processing proceeds to the next step. When the vehicle speed is 0, the execution of the step position control processing is ended until the next repetition timing. When the vehicle speed is higher than 0, the controller 50 executes second processing S2.

In the second processing S2, the controller 50 determines whether the step portion 13 is located at the traveling position P3. When the step portion 13 is located at the traveling position P3, the controller 50 executes fifth processing S5. When the step portion 13 is not located at the traveling position P3, the controller 50 executes third processing S3.

In the third processing S3, the controller 50 determines whether the vehicle speed is equal to or higher than the first speed. When the vehicle speed is equal to or higher than the first speed, the controller 50 controls the motor 14A to drive the step portion 13 to the traveling position P3 in fourth processing S4. Thereafter, the controller 50 ends the execution of the step position control processing until the next repetition timing.

In the fifth processing S5, the controller 50 determines whether the vehicle speed is equal to or lower than the second speed. When the vehicle speed is equal to or lower than the second speed, the controller 50 controls the motor 14A to drive the step portion 13 to the retracted position P1 in sixth processing S6. Thereafter, the controller 50 ends the execution of the step position control processing until the next repetition timing.

In the fifth processing S5, when the vehicle speed is not equal to or lower than the second speed, the controller 50 ends the execution of the step position control processing until the next repetition timing. In this case, the step portion 13 is maintained at the traveling position P3.

Operation

Next, an operation of the present embodiment will be described. During the traveling of the vehicle, an airflow that enters the space below the vehicle 1 from the side surface of the vehicle 1 is formed. Such an airflow causes the aerodynamic characteristics of the vehicle 1 to deteriorate. In the present embodiment, the step portion 13 is driven to the traveling position P3 during the traveling of the vehicle. The step portion 13 is disposed at the traveling position P3 during the traveling of the vehicle, so that the airflow entering the space below the vehicle 1 (the space between the bottom of the vehicle 1 and the road surface) from the side surface of the vehicle 1 is blocked. Therefore, the airflow on the side surface of the vehicle 1 is rectified, and the airflow in the space below the vehicle 1 is rectified. Therefore, the aerodynamic characteristics of the vehicle 1 are improved.

Effects

The effects of the present embodiment will be described.

(1) In the vehicle step device 10, the drive unit 14 deploys the step portion 13 to the traveling position P3 when the predetermined condition is satisfied in the vehicle traveling state. The traveling position P3 is located outward of the retracted position P1 of the step portion 13 in the vehicle width direction DX.

According to this configuration, when the step portion 13 is disposed at the traveling position P3 in the vehicle traveling state, the circulation of air between the inner region AR1 inward of the step portion 13 and the outer region AR2 outward of the step portion 13 is blocked, and thus the flow of air around the vehicle is rectified. Accordingly, the vehicle step device 10 can contribute to improvement in the aerodynamic characteristics of the vehicle 1 during the traveling of the vehicle.

(2) Specifically, the traveling position P3 is located between the retracted position P1 and the getting-on/off position P2 of the step portion 13 or at the getting-on/off position P2. Accordingly, the vehicle step device 10 can contribute to improvement in the aerodynamic characteristics of the vehicle 1 during the traveling of the vehicle.

(3) The traveling position P3 is located between the retracted position P1 and the getting-on/off position P2 in the vehicle width direction DX and inward of the predetermined position (vehicle width related predetermined position) separated by the predetermined distance outward in the vehicle width direction DX from the outermost end on the outermost side in the entire vehicle width, or is located at the predetermined position (vehicle width related predetermined position). The predetermined distance is 10 mm. According to this configuration, the possibility that the step portion 13 hits an object can be reduced during the traveling of the vehicle. For example, the possibility that the step portion 13 hits plants elongating in a manner of going out of the road can be reduced during the traveling of the vehicle.

(4) The traveling position P3 may be a position at which the step portion 13 is most deployed outward in the vehicle width direction DX. Accordingly, the vehicle step device 10 can contribute to improvement in the aerodynamic characteristics of the vehicle 1 during the traveling of the vehicle. When the step portion 13 is most deployed outward in the vehicle width direction DX, the aerodynamic characteristics may be further improved.

(5) When the vehicle speed is equal to or higher than the first speed, the drive unit 14 deploys the step portion 13 to the traveling position P3. According to this configuration, when the vehicle speed is equal to or higher than the first speed, the vehicle step device 10 can contribute to improvement in the aerodynamic characteristics of the vehicle 1 during the traveling of the vehicle.

(6) When the vehicle speed is equal to or lower than the second speed that is lower than the first speed in a state where the step portion 13 is deployed to the traveling position P3, the drive unit 14 drives the step portion 13 to the retracted position P1. According to this configuration, when the vehicle speed is equal to or lower than the second speed, the step portion 13 can be prevented from hitting an object. The second speed is a value smaller than the first speed. In this way, a condition for moving the step portion 13 from the retracted position P1 to the traveling position P3 is different from a condition for moving the step portion 13 from the traveling position P3 to the retracted position P1. Accordingly, the state where the step portion 13 is located at the traveling position P3 can be stabilized during the traveling of the vehicle.

(7) When the negative acceleration of the vehicle 1 is smaller than the first specified value in a state where the step portion 13 is maintained at the traveling position P3, the drive unit 14 drives the step portion 13 to the retracted position P1. When the vehicle 1 suddenly decelerates, there is a high possibility that there is an obstacle on a road surface, the road is a sharp curve, or the road surface is rough. Therefore, according to the above configuration, an object can be prevented from hitting the step portion 13, or the step portion 13 can be prevented from hitting the road.

(8) The vehicle step device 10 includes the base 11 and the arms 12 attached to the base 11 so as to be rotatable about the rotation shaft (the above-described first shaft). The step portion 13 is attached to the arms 12, the rotation shaft is inclined in the vehicle width direction DX with respect to a vehicle up-down direction, and the step portion 13 is deployed by the drive unit 14 by the rotation of the arms 12. The vehicle step device 10 is configured such that the step portion 13 is disposed at a lower position when the step portion 13 is located at the traveling position P3 than at the retracted position P1. According to this configuration, since the step portion 13 is disposed at a lower position at the traveling position P3 than at the retracted position P1, the aerodynamic characteristics can be improved.

(9) In the vehicle step device 10, the drive unit 14 drives the step portion 13 to the traveling position P3 that is between the retracted position P1 and the getting-on/off position P2 or at the getting-on/off position P2 when the predetermined condition is satisfied in the vehicle traveling state. The step portion 13 is maintained at the traveling position P3 during the traveling of the vehicle. According to this configuration, when the step portion 13 is disposed at the traveling position P3 in the vehicle traveling state, the circulation of air between the inner region AR1 and the outer region AR2 in the step portion 13 is blocked, and thus the flow of air around the vehicle 1 is rectified. Accordingly, the vehicle step device 10 can contribute to improvement in the aerodynamic characteristics of the vehicle 1 during the traveling of the vehicle.

(10) The vehicle step device 10 includes the base attached to the vehicle body 2 of the vehicle 1 and the arms attached to the base 11, and the step portion 13 is assembled to the arms 12. According to this configuration, the step portion 13 can be moved by the operation of the arms 12.

(11) The traveling position P3 is lower than the retracted position P1. According to this configuration, when the step portion 13 is disposed at the traveling position P3 during the traveling of the vehicle, the effect of blocking the circulation of air between the inner region AR1 and the outer region AR2 in the step portion 123 can be increased.

(12) The step portion 13 includes the rectifying portion 13X that rectifies the flow of air. According to this configuration, the vehicle step device 10 can contribute to improvement in the aerodynamic characteristics of the vehicle 1 during the traveling of the vehicle, compared with the vehicle 1 in which the rectifying portion 13X is not provided in the step portion 13.

(13) The rectifying portion 13X is formed as the barrier that blocks the circulation of air between the inner region AR1 inward of the step portion 13 and the outer region AR2 outward of the step portion 13 in the vehicle width direction DX. According to this configuration, the vehicle step device 10 can contribute to improvement in the aerodynamic characteristics of the vehicle 1 during the traveling of the vehicle.

(14) The rectifying portion 13X protrudes downward from an outer end of the step portion 13 and extends in the vehicle front-rear direction DY. According to this configuration, the vehicle step device 10 can contribute to improvement in the aerodynamic characteristics of the vehicle 1 during the traveling of the vehicle.

Second Embodiment

Figures 9, 10:
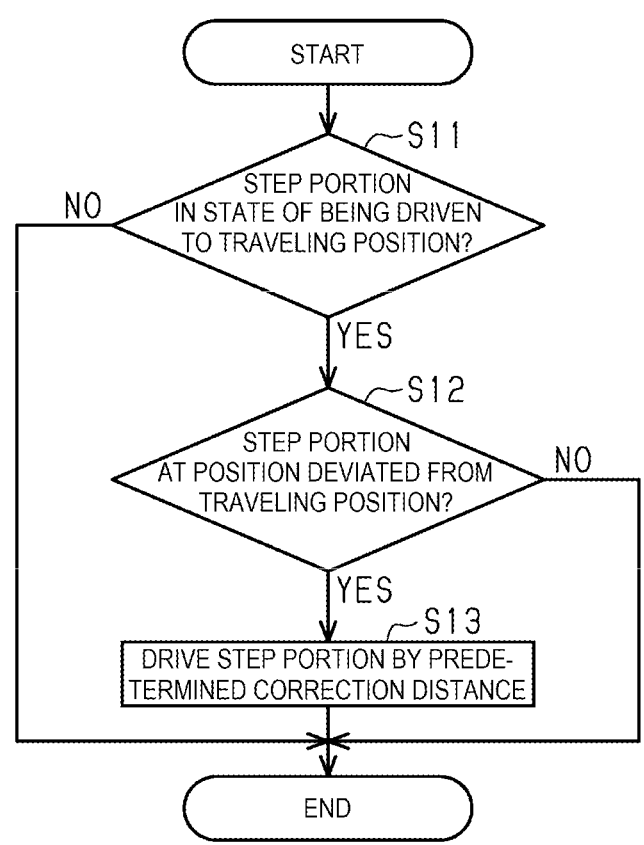
FIG. 9 is a bottom view of a vehicle step device according to a second embodiment, which shows an operation of a step portion in a vehicle traveling state.
FIG. 10 is a flowchart of step position correction control processing executed by the controller.

A vehicle step device 10 according to a second embodiment will be described with reference to FIGS. 9 and 10. In the present embodiment, components common to those in the first embodiment are denoted by the same reference numerals as those in the first embodiment, and description of the same components is omitted. FIG. 9 is a bottom view of the vehicle step device 10.

The vehicle step device 10 of the present embodiment is provided on a left side of the vehicle 1 in a plan view. The arms 12 are provided on the base 11 such that the distal end portions 12A of the arms 12 are located forward of the base portions 12B when the step portion 13 is located at the retracted position P1 and the getting-on/off position P2.

The vehicle step device 10 corrects the position of the step portion 13 when the step portion 13 is deviated from the traveling position P3 in a case where the step portion 13 is disposed at the traveling position P3 during the traveling of the vehicle. Hereinafter, a specific example will be described.

As shown in FIG. 9, in the present embodiment, as in the first embodiment, the traveling position P3 is located rearward of the retracted position P1 and forward of the getting-on/off position P2. In the vehicle traveling state, when the step portion 13 is located at the traveling position P3, the distal end portion 12A of the arm 12 is located forward of the base portion 12B.

As shown in FIG. 9, in the vehicle traveling state, when the step portion 13 is disposed at the traveling position P3, the position of the step portion 13 may deviate from the traveling position P3 due to a wind pressure (see a one-dot chain line in FIG. 9). In particular, when the vehicle 1 travels at a high speed, the position of the step portion 13 may deviate rearward from the traveling position P3 due to a high wind pressure.

Therefore, the drive unit 14 corrects the position of the step portion 13 such that the step portion 13 continues to be located at the traveling position P3 in the vehicle traveling state. Hereinafter, an operation of the controller 50 of the drive unit 14 will be described.

The controller 50 of the drive unit 14 is provided with a detection unit that detects the position of the step portion 13. An example of the detection unit is a rotor detector provided in the motor 14A of the drive unit 14. The rotor detector detects movement of a rotor by pulses. A movement distance of the step portion 13 can be detected by the movement of the rotor, that is, the number of times of pulse detection. Specifically, by detecting the movement of the rotor of the motor 14A of the drive unit 14 by the pulses based on a force due to the rotation of the arms 12, it is possible to determine how much the position of the step portion 13 deviates from the traveling position P3 based on the pulses. When the step portion 13 is deviated, the step portion 13 can be returned to the original traveling position P3 by rotating the rotor so as to return the detected pulses. Using this point, the controller 50 operates as follows. When the detection unit detects that the position of the step portion 13 is deviated from the traveling position P3, the controller 50 returns the step portion 13 to the traveling position P3.

Even when the step portion 13 is deviated outward in the vehicle width direction DX from the traveling position P3, a determination necessary stroke is set such that the step portion 13 does not come out of the above-described predetermined position (that is, the vehicle width related predetermined position). The determination necessary stroke indicates a deviation amount of the step portion 13 that can be detected by a detection unit, and is represented by the number of pulses in one example. When the detection unit detects pulses corresponding to the determination necessary stroke, the drive unit 14 drives the step portion 13 to return to the traveling position P3. The traveling position P3 is set at a position obtained by subtracting the determination necessary stroke (the number of pulses) from the predetermined position (that is, the vehicle width related predetermined position) or the regulation position.

The position of the step portion 13 may be detected by the following detection mechanism. A switch is provided such that the switch is directly or indirectly in contact with the step portion 13 when the step portion 13 is disposed at the traveling position P3. Then, it may be determined whether the position of the step portion 13 is deviated from the traveling position P3 when the step portion 13 is separated from the switch. The switch and the above-described pulse detection may be used in combination.

Even when the step portion 13 is deviated outward in the vehicle width direction DX from the traveling position P3, a determination necessary switch stroke is set such that the step portion 13 is not located outward of the predetermined position (for example, the vehicle width related predetermined position) separated from the traveling position P3 by the predetermined distance. The determination necessary switch stroke indicates a deviation amount of the step portion 13 that can be detected by the switch, and is represented by a moving amount of a moving body of the switch, for example. Specifically, the traveling position P3 is set at a position obtained by subtracting the determination necessary switch stroke from the predetermined position (for example, the vehicle width related predetermined position) or the regulation position. In this case, the traveling position P3 may be set at a position equivalent to the predetermined position (for example, the vehicle width related predetermined position) separated by the predetermined distance.

The position of the step portion 13 may be detected by still another detection mechanism. The controller 50 includes a position sensor (not shown) that detects the position of the step portion 13. The position sensor is implemented by, for example, a distance sensor that measures a distance by an infrared ray. The position sensor is fixed to the base 11. The position sensor measures a distance between the base 11 and the step portion 13 in the vehicle width direction DX. The controller 50 determines whether the distance between the base 11 and the step portion 13 is within a predetermined range based on a measurement value acquired by the position sensor. When the distance between the base 11 and the step portion 13 is not within the predetermined range, the controller 50 determines that the position of the step portion 13 is deviated from the traveling position P3. When it is determined that the position of the step portion 13 is deviated rearward from the traveling position P3, the controller 50 returns the step portion 13 to the traveling position P3 by driving the step portion 13 forward.

In an attachment structure of the arms 12 according to the present embodiment, the step portion 13 is deviated rearward and obliquely outward by wind force. Therefore, when the controller of the drive unit 14 determines that the step portion 13 is deviated obliquely rearward and outward and the position of the step portion 13 is deviated from the traveling position P3, the controller 50 rotates the arms 12 such that the step portion 13 moves inward in the vehicle width direction DX by a predetermined correction distance. The controller 50 may determine whether the position of the step portion 13 is deviated from the traveling position P3 based on the position or the rotation angle of the arms 12.

Step position correction control processing will be described with reference to FIG. 10. The controller 50 executes the step position correction control processing during the traveling of the vehicle. The controller 50 repeatedly executes the step position correction control processing. The controller 50 may periodically execute the step position correction control processing. The controller 50 corrects the position of the step portion 13 during the traveling of the vehicle by executing the step position correction control processing.

In eleventh processing S11, the controller 50 determines whether the step portion 13 is in a state of being driven to the traveling position P3. Specifically, the controller 50 stores a first state indicating that the step portion 13 has been driven to the traveling position P3, a second state indicating that the step portion 13 has been driven to the retracted position P1, and a third state indicating that the step portion 13 has been driven to the getting-on/off position P2. Then, the controller 50 determines the position of the step portion 13 based on the stored information. When the controller 50 determines that the step portion 13 is in the state of being driven to the traveling position P3, the controller 50 executes twelfth processing S12. When the controller 50 determines that the step portion 13 is not in the state of being driven to the traveling position P3, the controller ends the execution of the step position correction control processing until the next repetition time.

In the twelfth processing S12, the controller 50 determines whether the step portion 13 is located at a position deviated from the traveling position P3 based on the measurement value acquired by the position sensor. When it is determined that the step portion 13 is located at the position deviated from the traveling position P3, the controller 50 executes thirteenth processing S13. When the controller 50 determines that the step portion 13 is not located at the position deviated from the traveling position P3, the controller 50 ends the execution of the step position correction control processing until the next repetition time.

In the thirteenth processing S13, the controller 50 drives the step portion 13 by the predetermined correction distance. Specifically, the controller 50 controls the motor 14A so as to drive the step portion 13 by the predetermined correction distance in a direction approaching the traveling position P3. Specifically, when the step portion 13 moves rearward due to a wind pressure in the vehicle traveling state, the controller 50 determines that the step portion 13 is deviated from the traveling position P3. In this case, the controller 50 rotates the arms 12 in an arrow direction in FIG. 9 based on the control of the motor 14A, thereby driving the step portion 13 inward in the vehicle width direction DX by the predetermined correction distance.

Effects (1) In the vehicle step device 10 according to the present embodiment, the drive unit 14 corrects the position of the step portion 13 such that the step portion 13 continues to be located at the traveling position P3 in the vehicle traveling state. According to this configuration, it is possible to suppress a reduction in the effect of improving the aerodynamic characteristics of the vehicle 1 based on the step portion 13.

(2) When the detection unit detects that the position of the step portion 13 is deviated from the traveling position P3, the drive unit 14 returns the step portion 13 to the traveling position P3. According to this configuration, since the detection unit that detects the position of the step portion 13 is provided, the step portion 13 can be quickly returned to the traveling position P3.

(3) The drive unit 14 may correct the position of the step portion 13 based on a change in the distance between the step portion 13 and the base 11. According to this configuration, the position of the step portion 13 can be corrected by detecting the distance between the step portion 13 and the base 11.

(4) The drive unit 14 may correct the position of the step portion 13 based on a change in the angle of the arms 12 with respect to the base 11. According to this configuration, the position of the step portion 13 can be corrected by detecting the angle of the arms 12.

(5) The drive unit 14 may correct the position of the step portion 13 based on the wind pressure received by the vehicle 1. In this case, the controller 50 has data indicating a relationship between the wind pressure and a position change of the step portion 13. The controller 50 corrects the position of the step portion 13 based on the data. According to this configuration as well, the same effect as in the above (2) or (3) can be obtained.

(6) The drive unit 14 may correct the position of the step portion 13 based on a vehicle speed. In this case, the controller 50 has data indicating a relationship between the vehicle speed and the positional change of the step portion 13. The controller 50 corrects the position of the step portion 13 based on the data. According to this configuration, the structure of the drive unit 14 can be simplified as compared with a case where the controller 50 includes the position sensor.

Other Modifications

The above embodiment is not limited to the example having the above configuration. The above embodiment can be modified as follows. In the following modifications, configurations that are substantially the same as the configurations of the above embodiment are denoted by the reference numerals identical to those in the configurations of the above embodiment and will be described.

In the first embodiment, the rectifying portion 13X of the step portion 13 may be provided integrally with the step body portion 41. For example, the step body portion 41 and the rectifying portion 13X are integrally formed by drawing aluminum or extruding aluminum.

In the first embodiment, the rectifying portion 13X of the step portion 13 may be provided separately from the step body portion 41. The rectifying portion 13X may be formed of a resin. The rectifying portion 13X may be formed of a metal plate.

In the first embodiment, the rectifying portion 13X of the step portion 13 may be provided separately from the step body portion 41 and may be attachable to and detachable from the step body portion 41. For example, the rectifying portion 13X is attached to the step body portion 41 by a bolt. According to this configuration, regarding the rectifying portion 13X, the rectifying portion 13X can be attached to the step body portion 41 as necessary. For example, when the vehicle 1 is used for traveling in an urban area, the rectifying portion 13X is detached from the step body portion 41. When the vehicle 1 is used for moving to a far distance using a highway, the rectifying portion 13X is attached to the step body portion 41.

A shape of the rectifying portion 13X is not limited to the example of the embodiment. The rectifying portion 13X may be formed of a plate material. When the rectifying portion 13X is formed of a plate material, the rectifying portion 13X may be foldable via a hinge. For example, when the vehicle 1 is used for traveling in an urban area, the rectifying portion 13X is folded. When the vehicle 1 is used for moving to a far distance using a highway, the rectifying portion 13X hangs downward from the outer end of the step portion 13.

In the embodiment, the step portion 13 includes the rectifying portion 13X, and the rectifying portion 13X may be omitted. Even when the step portion 13 does not include the rectifying portion 13X, the flow of air can be rectified by maintaining the step portion 13 at the traveling position P3 during the traveling of the vehicle. Therefore, the aerodynamic characteristics of the vehicle 1 can be improved.

In the first embodiment, the traveling position P3 of the step portion 13 is located between the intermediate position PM and the retracted position P1, or is located at the intermediate position PM. In contrast, in a modification of the vehicle step device 10, the traveling position P3 may be a position between the intermediate position PM and the getting-on/off position P2 in the vehicle width direction DX, or may be the intermediate position PM. In another modification of the vehicle step device 10, the traveling position P3 may be the getting-on/off position P2 in the vehicle width direction DX. According to this configuration, the step portion 13 can rectify the flow of air in a vicinity of the getting-on/off position P2 during the traveling of the vehicle. Accordingly, the vehicle step device 10 can contribute to improvement in the aerodynamic characteristics of the vehicle 1 during the traveling of the vehicle.

In the first embodiment, when the step portion 13 is located at the traveling position P3, the distal end portion 12A of the arm 12 is located forward of the base portion 12B. In contrast, in the modification, when the step portion 13 is located at the traveling position P3, the distal end portion 12A of the arm 12 is located rearward of the base portion 12B. According to this configuration, when an object hits the step portion 13 from the front while the vehicle is traveling, the arms 12 easily rotate such that the distal end portions 12A of the arms 12 move rearward. Therefore, a part of the energy occurred when the object hits is absorbed as a rotational energy of the step portion 13. Accordingly, the deformation of the step portion 13 occurred when the object hits the step position 13 can be reduced.

In the vehicle step device 10 according to the first embodiment, the step portion 13 includes the rectifying portion 13X, and the step portion 13 is maintained at the traveling position P3 during the traveling of the vehicle. In contrast, in the modification of the vehicle step device 10, the step portion 13 includes the rectifying portion 13X, and the step position 13 is not maintained at the traveling position P3 during the traveling of the vehicle. With such a configuration, the vehicle step device 10 can also contribute to the improvement in the aerodynamic characteristics of the vehicle 1 during the traveling of the vehicle by the action of the rectifying portion 13X of the step portion 13.

In the second embodiment, the vehicle step device 10 is provided on a left side of the vehicle 1 in plan view. When the step portion 13 is located at the traveling position P3, the distal end portion 12A of the arm 12 is located further forward than the base portion 12B. In contrast, in a modification of the second embodiment, the vehicle step device 10 is provided on a left side of the vehicle 1 in a plan view. When the step portion 13 is located at the traveling position P3, the distal end portion 12A of the arm 12 is located further rearward than the base portion 12B. According to this configuration, when an object hits the step portion 13 from the front while the vehicle is traveling, the arms 12 easily rotate such that the distal end portions 12A of the arms 12 move rearward. Therefore, a part of the energy occurred when the object hits is absorbed as a rotational energy of the step portion 13. Accordingly, the deformation of the step portion 13 occurred when the object hits the step position 13 can be reduced.

Figures 11, 12:
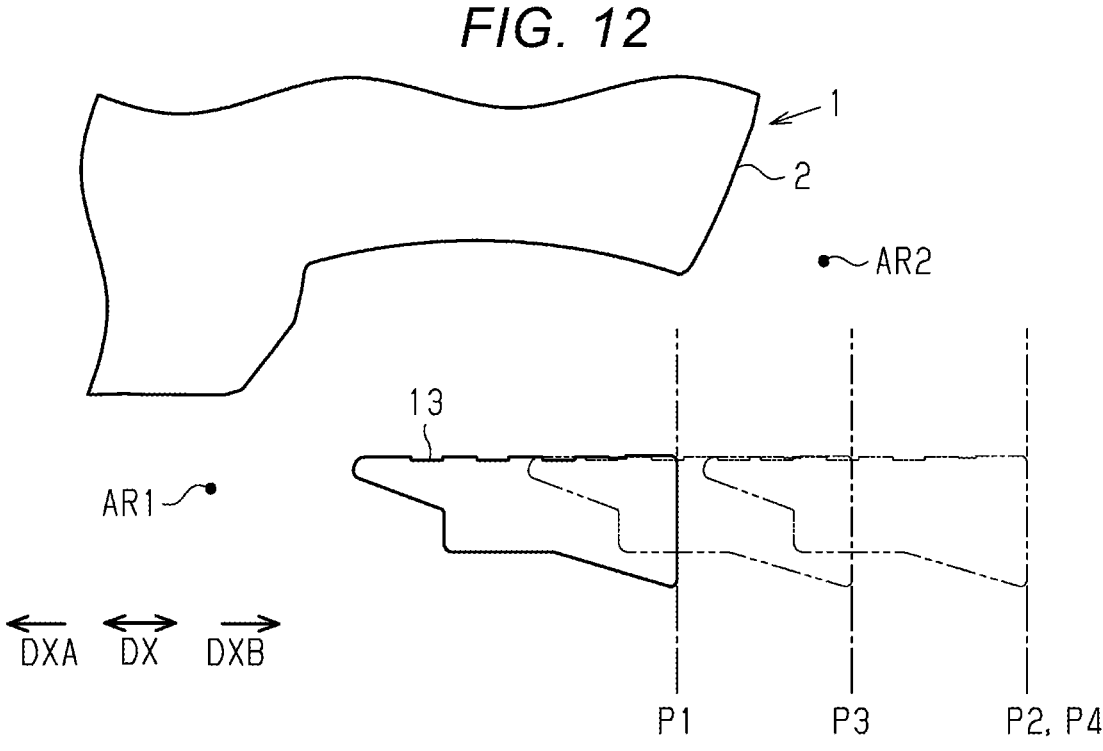
FIG. 11 is a bottom view of a vehicle step device according to another embodiment, which shows an operation of a step portion in a vehicle traveling state.
FIG. 12 is a diagram illustrating a movement of a step portion in a modification of the vehicle step device.

As shown in FIG. 11, in this modification, the traveling position P3 is located forward of the retracted position P1. The traveling position P3 is located rearward of the getting-on/off position P2. In the vehicle traveling state, when the step portion 13 is located at the traveling position P3, the distal end portion 12A of the arm 12 is located rearward of the base portion 12B. Further, the arms 12 are provided on the base 11 such that the distal end portions 12A of the arms 12 are located rearward of the base portions 12B when the step portion 13 is located at the retracted position P1 and the getting-on/off position P2.

As shown in FIG. 11, in the vehicle traveling state, when the step portion 13 is disposed at the traveling position P3, the position of the step portion 13 may deviate from the traveling position P3 due to a wind pressure (see a one-dot chain line in FIG. 11). In particular, when the vehicle 1 travels at a high speed, the position of the step portion 13 may deviate rearward from the traveling position P3 due to a high wind pressure. In this modification, the drive unit 14 operates as follows. In the attachment structure of the arms 12 in this modification, the step portion 13 is deviated rearward and obliquely inward by wind force. Therefore, the drive unit 14 corrects the position of the step portion 13 such that the step portion 13 continues to be located at the traveling position P3 in the vehicle traveling state. For example, the controller 50 determines that the step portion 13 is deviated rearward from the traveling position P3. In this case, the controller 50 rotates the arms 12 in an arrow direction in FIG. 11 based on the control of the motor 14A, thereby driving the step portion 13 outward in the vehicle width direction DX by a predetermined correction distance. Specifically, when the controller 50 of the drive unit 14 determines that the step portion 13 is deviated obliquely rearward and inward and the position of the step portion 13 is deviated from the traveling position P3, the controller 50 rotates the arms 12 such that the step portion 13 moves outward in the vehicle width direction DX by the predetermined correction distance.

In each embodiment, the arm 12 may be rotated by 90 degrees or more. In this case, the maximum deployed position P4 of the step portion 13 is defined as a position of the step portion 13 when the distal end portion 12A of the arm 12 is located at a position farthest outward from the base portion 12B of the arm 12.

The technique in this disclosure can be applied to various vehicle step devices 10 regardless of a driving method of the drive unit 14 for driving the step portion 13. Examples of the driving method include a driving method of horizontally turning the distal end portion 12A of the arm 12 and a driving method of driving the distal end portion 12A of the arm 12 in a vehicle up-down direction.

In one example, as shown in FIG. 12, the present technology is also applied to the vehicle step device 10 in which the step portion 13 is moved in the horizontal direction from the retracted position P1. The traveling position P3 is located between the retracted position P1 and the getting-on/off position P2. In this case, the traveling position P3 is located at the same height as the retracted position P1 and the getting-on/off position P2.

In each embodiment, the step portion 13 is moved by the operation of the arms 12, but a mechanism for driving the step portion 13 is not limited thereto. For example, the step portion 13 may be rotated about a line along the vehicle front-rear direction DY by a rotation mechanism. In this case, the step portion 13 includes a shaft portion or a bearing portion extending in the front-rear direction in an inner portion of the step portion 13. The step portion 13 is rotatably attached to the vehicle body 2 by the shaft portion or the bearing portion. The step portion 13 rotates about the line along the vehicle front-rear direction DY by an operation of the drive unit 14. The drive unit 14 includes the controller 50, a gear mechanism that rotates the step portion 13, and a power source that operates the gear mechanism. In the vehicle step device 10 having such a configuration, the drive unit 14 moves the step portion 13 to the traveling position P3 that is between the retracted position P1 and the getting-on/off position P2 or at the getting-on/off position P2 when a predetermined condition is satisfied in the vehicle traveling state.

The technique according to the embodiment can be applied to the vehicle 1 including the vehicle step device 10. In this case, the step position control processing or the step position correction control processing executed by the controller 50 may be executed by the vehicle control device of the vehicle 1.

According to aspect 1 of this disclosure, a vehicle step device includes: a step portion that is attached to a side of a vehicle and is deployed from a retracted position to a getting-on/off position when an occupant gets on and off the vehicle; and a drive unit configured to drive the step portion between the retracted position and the getting-on/off position, in which the drive unit deploys the step portion to a traveling position located outward of the retracted position in a vehicle width direction when a predetermined condition is satisfied in a vehicle traveling state.

According to this configuration, when the step portion is disposed at the traveling position in the vehicle traveling state, the circulation of air between an inner region located inward of the step portion and an outer region located outward of the step portion is blocked, and thus the flow of air around the vehicle is rectified. Accordingly, the vehicle step device can contribute to improvement in aerodynamic characteristics of the vehicle during the traveling of the vehicle.

According to aspect 2, in the vehicle step device according to the aspect 1, the traveling position is located between the retracted position and the getting-on/off position or at the getting-on/off position. According to this configuration, the vehicle step device can contribute to improvement in the aerodynamic characteristics of the vehicle during the traveling of the vehicle.

According to aspect 3, in the vehicle step device according to the aspect 1, the traveling position is located between the retracted position and the getting-on/off position in the vehicle width direction and inward of a predetermined position separated by a predetermined distance outward in the vehicle width direction from an outermost end on an outermost side in an entire vehicle width, or is located at the predetermined position, and the predetermined distance is 10 mm. According to this configuration, hitting of the step portion with an object during the traveling of the vehicle can be reduced.

According to aspect 4, in the vehicle step device according to the aspect 1, the traveling position is a position at which the step portion is most deployed outward in the vehicle width direction. According to this configuration, the vehicle step device can contribute to improvement in the aerodynamic characteristics of the vehicle during the traveling of the vehicle.

According to aspect 5, in the vehicle step device according to any one of the aspects 1 to 4, the drive unit deploys the step portion to the traveling position when a vehicle speed is equal to or higher than a first speed. According to this configuration, when the vehicle speed is equal to or higher than the first speed, the vehicle step device can contribute to improvement in the aerodynamic characteristics of the vehicle during the traveling of the vehicle.

According to aspect 6, in the vehicle step device according to the aspect 5, the drive unit drives the step portion to the retracted position when the vehicle speed is equal to or lower than a second speed that is lower than the first speed in a state where the step portion is deployed at the traveling position. According to this configuration, when the vehicle speed is equal to or lower than the second speed, the step portion can be prevented from hitting an object. The second speed is a value smaller than the first speed. In this way, a condition for moving the step portion from the retracted position to the traveling position is different from a condition for moving the step portion from the traveling position to the retracted position. Accordingly, a state where the step portion is located at the traveling position during the traveling of the vehicle can be stabilized.

According to aspect 7, in the vehicle step device according to any one of the aspects 1 to 6, the drive unit corrects a position of the step portion such that the step portion continues to be located at the traveling position in the vehicle traveling state.

The step portion may deviate from the traveling position due to wind force while the vehicle is traveling. In this case, an effect of improving the aerodynamic characteristics of the vehicle based on the step portion may be reduced. In this respect, according to the above configuration, it is possible to suppress the reduction in the effect of improving the aerodynamic characteristics of the vehicle based on the step portion.

According to aspect 8, in the vehicle step device according to any one of the aspects 1 to 7, a detection unit configured to detect a position of the step portion is provided, and the drive unit returns the step portion to the traveling position when the detection unit detects that a position of the step portion is deviated from the traveling position. According to this configuration, since the detection unit that detects the position of the step portion is provided, the step portion can be quickly returned to the traveling position.

According to aspect 9, in the vehicle step device according to any one of the aspects 1 to 8, the drive unit drives the step portion to the retracted position when a negative acceleration of the vehicle becomes smaller than a first specified value in a state where the step portion is deployed to the traveling position. When the vehicle suddenly decelerates, there is a high possibility that there is an obstacle on a road surface, a road is a sharp curve, or the road surface is rough. Therefore, according to the above configuration, the step portion can be prevented from hitting the object or the road.

According to aspect 10, the vehicle step device according to any one of the aspects 1 to 9 further includes: a base that is attached to a vehicle body of the vehicle; and an arm that is attached to the base so as to be rotatable about a rotation shaft, in which the step portion is attached to the arm, the rotation shaft is inclined in a vehicle width direction with respect to a vehicle up-down direction, the step portion is deployed by the drive unit by rotation of the arm, and the step portion is disposed at a lower position at the traveling position than at the retracted position. According to the configuration, since the step portion is disposed at a lower position at the traveling position than at the retracted position, the aerodynamic characteristics can be improved.

According to aspect 11, a vehicle includes the vehicle step device according to any one of the aspects 1 to 10. This configuration can contribute to improvement in the aerodynamic characteristics of the vehicle during the traveling of the vehicle.

A vehicle step device and a vehicle including the vehicle step device can contribute to improvement in aerodynamic characteristics of the vehicle during traveling of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle step device comprising:
a step portion that is attached to a side of a vehicle and is deployed from a retracted position to a getting-on/off position when an occupant gets on and off the vehicle; and
a drive unit configured to drive the step portion between the retracted position and the getting-on/off position, wherein
the drive unit deploys the step portion to a traveling position located outward of the retracted position in a vehicle width direction when a predetermined condition is satisfied in a vehicle traveling state, and
the drive unit drives the step portion to the retracted position when a negative acceleration of the vehicle becomes smaller than a first specified value in a state where the step portion is deployed to the traveling position.

2. The vehicle step device according to claim 1, wherein the traveling position is located between the retracted position and the getting-on/off position or at the getting-on/off position.

3. The vehicle step device according to claim 1, wherein the traveling position is located anywhere from a position outward of the retracted position in the vehicle width direction to a position separated by a distance of 10 mm outward in the vehicle width direction from an outermost end on an outermost side in an entire vehicle width.

4. The vehicle step device according to claim 1, wherein the traveling position is a position at which the step portion is most deployed outward in the vehicle width direction.

5. The vehicle step device according to claim 1, wherein the drive unit deploys the step portion to the traveling position when a vehicle speed is equal to or higher than a first speed.

6. The vehicle step device according to claim 5, wherein the drive unit drives the step portion to the retracted position when the vehicle speed is equal to or lower than a second speed that is lower than the first speed in a state where the step portion is deployed at the traveling position.

7. The vehicle step device according to claim 5, wherein a detection unit configured to detect a position of the step portion is provided, and
the drive unit returns the step portion to the traveling position when the detection unit detects that a position of the step portion is deviated from the traveling position.

8. The vehicle step device according to claim 1, wherein the drive unit corrects a position of the step portion such that the step portion continues to be located at the traveling position in the vehicle traveling state.

9. The vehicle step device according to claim 1 further comprising:
a base that is attached to a vehicle body of the vehicle; and
an arm that is attached to the base so as to be rotatable about a rotation shaft, wherein
the step portion is attached to the arm, and
the rotation shaft is inclined in a vehicle width direction with respect to a vehicle up-down direction, the step portion is deployed by the drive unit by rotation of the arm, and the step portion is disposed at a lower position at the traveling position than at the retracted position.

10. A vehicle comprising:
the vehicle step device according to claim 1.

* * * * *